United States Patent Office 2,812,359
Patented Nov. 5, 1957

2,812,359

PRODUCTION OF HYDROXY AND POLYHYDROXY ETHERS HAVING AN ACTION SIMILAR TO CURARE

Otto Schlichting, Heinz Pachaly, Franz Westphal, and August Amann, Ludwigshafen (Rhine), Germany, assignors to Badische Anilin- & Soda-Fabrik Aktiengesellschaft, Ludwigshafen (Rhine), Rheinland-Pfalz, Germany No Drawing. Application September 13, 1956,
Serial No. 609,551

Claims priority, application Germany September 29, 1955

4 Claims. (Cl. 260—611)

This invention relates to new hydroxy and polyhydroxy ethers of cyclooctanediol-(1.2) and to processes for producing the same.

It is known that glycerin ethers of phenols, for example of ortho-cresol or guaiacol, exhibit an action similar to curare. The action dies away, however, even after a short time; moreover undesirable side reactions occur (see B. Mallison, Proc. Roy. Soc. med. 40 (1947), 598; J. I. Pugh and G. H. Hale-Enderby, Lancet 1947, 253; E. Levas, Compt. rend. hebd. Seances Acad. Sci. 223 (1946), 901; W. Braddley and F. M. Berger, Nature (London) 159 (1947), 813).

We have now found that new hydroxy and polyhydroxy ethers having an action similar to curare are obtained by synthesizing by known methods compounds of the general formula

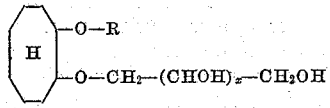

in which $x$ represents 1, 2, 3 or 0 and R represents a lower alkyl or alkenyl radical, which if desired may contain hydroxy and/or ether groups, by (a) treating with dilute mineral acids, ethers of cyclooctanediol-(1.2) of the general formula

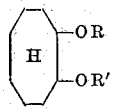

in which R represents a lower alkyl or alkenyl group and R' represents a glycide group which may contain hydroxy, acyloxy or/and ether groups, (b) treating with organic peracids, ethers of the formula given under (a) above in which R has the significance therein specified and R' represents an allyl group which may contain hydroxy, acyloxy or/and ether groups, or (c) reacting with ethylene oxide ethers of the above formula in which R represents hydrogen and R' represents a lower alkyl or alkenyl radical which may contain hydroxy and/or ether groups.

Initial materials for embodiment (a) of the invention are obtained by reacting 1.2-epoxy cyclooctane in the presence of acid catalysts first with halogen-free alcohols, such as methanol, propanol or allyl alcohol, allowing epihalogenhydrins, such as epichlorhydrin, to act on the resultant monoethers of cyclooctanediol-(1.2) preferably also in the presence of acid catalysts, whereupon the diethers containing a halohydrin group thus formed are treated with alkali. In this way there are formed mixed ethers of cyclooctanediol-(1.2) which contain a glycide group and which therefore are suitable as initial materials for embodiment (a) of the present invention.

The conversion of the glycide ethers into the desired hydroxy or polyhydroxy alkyl ethers is effected for example by heating with dilute sulfuric or phosphoric acid, for example with 2-normal sulfuric acid at 70° to 90° C. In this way the glycide ring is opened without the ether linkages being split; any acyloxy groups present are in general saponified also.

Initial materials for embodiment (b) of the invention are obtained for example by allowing alcohols which contain an allyl group, as for example allyl alcohol, to act on the 1.2-epoxy cyclooctane in the presence of acid catalysts; the resultant monoallyl ethers are then converted into the corresponding diethers by treatment, preferably in the form of their alkali metal derivatives, with alkylating agents, such as methyl, ethyl, propyl or allyl halides. The same diethers suitable for use as initial materials for the embodiment (b) of this invention can also be prepared by reacting the said halogenfree monoethers of cyclooctanediol-(1.2) in the form of their alkali metal derivatives with allyl halides, as for example allyl bromide.

Compounds of this kind are also obtained by first converting the 1.2 epoxy cyclooctane with acetylene alcohols, such as propargyl alcohol, into the mono-propinyl ether of cyclooctanediol-(1.2) reacting the latter, if desired in the form of their alkali metal derivatives, with alkylating agents, and partly hydrogenating the triple linkage, for example with finely divided palladium as catalyst. The monoethers of the cyclooctanediol-(1.2) obtainable from 1.2-epoxy cyclooctane and saturated alcohols may also be reacted in the form of their alkali metal salts with alkinyl halides, such as propargyl bromide, and the triple linkage then partly hydrogenated.

The conversion of the initial materials containing allyl groups thus obtained into the desired end products is effected according to embodiment (b) of the present invention by heating them with aqueous peracids, such as performic, peracetic or perbenzoic acid.

The initial materials containing allyl groups can also be converted into ethers containing glycide groups by treatment with anhydrous peracids, or they may first be treated with hypochlorous acid and from the resultant halohydrin ethers there may be obtained with the aid of alkali the ethers containing glycide groups which are then suitable as initial materials for the embodiment (a) of the invention.

Initial materials for embodiment (c) of the invention are the reaction products of halogen-free alcohols on 1.2-epoxy cyclooctane already described.

The hydroxy and polyhydroxy ethers of the first general formula given above obtainable by the various embodiments of the invention are colorless and odorless, viscous liquids which are readily soluble or dispersible in water. They are less poisonous than the known glycerin monoethers of aromatic hydroxy compounds, as for example of ortho-cresol or of guaiacol, and in part have considerably more prolonged and stronger curare-like centrally-acting muscular relaxing properties than the same.

The following examples will further illustrate this invention but the invention is not restricted to these examples. The parts specified are parts by weight.

Example 1

A mixture of 60 parts of epichlorohydrin and 60 parts of alpha-methoxycyclo-octanol (boiling at 112 to 116° C. under a pressure of 23 Torr. and obtained by dissolving 300 parts of 1.2-epoxy cyclooctane in 1.200 parts of absolute methanol containing 60 parts of boron trifluoride etherate, neutralizing after 8 hours and distilling off the excess methanol) is allowed to flow into a solution of 15 parts of boron fluoride etherate in 270 parts of alphamethoxycyclo-octanol at 10° C. while stirring during the course of 7 to 8 hours. The reaction mixture is allowed to stand overnight at room temperature, then made weakly alkaline with sodium carbonate solution and diluted with chloroform. After separating the aqueous layer and drying over sodium sulfate, the chloroform is evaporated in vacuo. By fractional distillation of the residue there first passes over the unreacted alpha-methoxycyclo-octanol (boiling point 70° to 71° C. under a pressure of 0.6 millimeters of mercury, absolute).

The fraction boiling at 125° to 127° C. at 0.2 Torr. consists of 2-methoxycyclo-octanol-1-(gamma-chlor-beta-hydroxypropyl) ether. The yield amounts to 100 parts.

50 parts of the glycerine monochlorhydrin ether thus obtained are stirred with a solution of 16 parts of sodium hydroxide in 215 parts of water for 2 hours at 75° C. After cooling, it is extracted with chloroform, the chloroform solution dried with sodium sulfate, the solvent evaporated and the residue subjected to fractional distillation. 25 parts of 2-methoxycyclo-octanolglycide ether of the boiling point 86° to 90° C. at 0.05 millimeters of mercury, absolute are obtained.

The glycide ether is stirred with 50 parts of 2-normal sulfuric acid for 5 hours at 85° C. After cooling, it is neutralized with sodium carbonate, the solution extracted with chloroform, the extract dried with sodium sulfate, the solvent evaporated and the oily residue distilled. 18 parts of 2-methoxycyclo-octanol-(1)-glycerine ether of the boiling point 135° to 140° C. at 0.05 millimeters of mercury, absolute are obtained as a highly viscous, colorless and odorless oil.

The new glycerin ether exhibits, in the case of peroral and intraperitoenal administration of 0.4 gram per kilogram of mouse, a protective action against extensor cramp produced by pentamethylene tetrazole even after 60 minutes, whereas the protective action of ortho-tolyl-(1)-glycerin ether has died away after 15 minutes.

Example 2

314 parts of alpha-methoxycyclo-octanol (obtained as described in Example 1) are allowed to flow gradually while stirring into a suspension of 45.5 parts of sodium powder in 280 parts of dry toluene, the mixture thereby heating up with the evolution of hydrogen. It is further heated under reflux until the sodium has completely dissolved. It is then cooled to 20° to 25° C. and 284 parts of allyl bromide are added during the course of an hour while stirring. When the heat of reaction has been dissipated, the mixture is stirred for 2 hours at 60° C. and 3 hours at 70° C., sodium bromide separating out. It is shaken with water to remove the sodium bromide; the toluene layer is dried and the toluene is distilled off. By fractional distillation of the residue there is obtained a first runnings of 15 parts of the boiling point 69° to 74° C. at 0.4 Torr. and then 284 parts of 1-allyloxy-2-methoxycyclo-octane of the boiling point 75° to 78° C. at 0.4 millimeters of mercury, absolute ($D_4^{20}=0.9577$, $n_D^{20}=1.4680$).

The same diether is obtained by converting the alpha-allyloxycyclo-octanol (boiling at 87° C. under a pressure of 0.3 millimeters of mercury, absolute and obtained by reacting 1.2-epoxy cyclooctane with allyl alcohol instead of methanol by the method described in Example 1) into its sodium derivative and reacting the latter in a pressure vessel with methyl chloride.

50 parts of the diether obtained by any of the methods described above are gradually stirred at 10° C. into a solution of performic acid which has been prepared by mixing 125 parts of concentrated formic acid with 50 parts of 35% hydrogen peroxide and allowing to stand for one hour at room temperature. The oxidation mixture is stirred for 1 hour at 10° C., then for 16 hours at 20° C. and finally for 10 hours at 30° C.; it is then concentrated under a water-jet pump at a temperature not exceeding 37° C., 70 parts of 30% caustic soda are added and stirred for an hour at 30° C. After neutralizing with 20% sulfuric acid, the organic layer is taken up with chloroform, the chloroform solution washed with sodium bisulfite solution and then with sodium carbonate solution, dried over sodium sulfate and the chloroform distilled off. 26 parts of the same 2-methoxycyclo-octanol-(1)-glycerin ether (boiling point 135° to 140° C. at 0.05 millimeters of mercury, absolute) as in Example 1 are obtained.

What we claim is:

1. The 2-methoxycyclo-octanol-(1)-glycerin ether of the formula

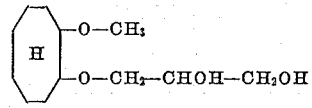

2. A process for the production of 2-methoxycyclo-octanol-(1)-glycerin ether which comprises reacting in the presence of boron trifluoride etherate first 1.2-epoxy cyclooctane with excess methanol and then the 2-methoxy cyclooctanol-(1) obtained with epichlorhydrin, treating the 2-methoxy cyclooctanol-(1)-(gamma chlor-beta-hydroxypropyl) ether at about 75° C. with an aqueous sodium hydroxide solution and treating the obtained 2-methoxy cyclooctanol-(1)-glycide ether with aqueous sulfuric acid at about 85° C.

3. A process for the production of 2-methoxycyclo-octanol-(1)-glycerin ether which comprises reacting 1.2-epoxycyclooctane in the presence of boron trifluoride etherate with excess methanol introducing allyl bromide into a methanolic solution of the sodium derivative of the 2-methoxy cyclooctanol-(1) thus obtained and introducing the 1-allyloxy-2-methoxy cyclooctane at about 10° C. into a performic acid solution.

4. A process for the production of 2-methoxycyclo-octanol-(1)-glycerin ether which comprises reacting 1.2-epoxycyclooctane in the presence of boron trifluoride etherate with excess allyl alcohol, reacting the sodium derivative of the 1-allyloxy cyclooctanol-(2) with methyl chloride in a pressure vessel and introducing the 1-allyloxy-2-methoxy cyclooctane at about 10° C. into a performic acid solution.

References Cited in the file of this patent

UNITED STATES PATENTS 2,769,017     Reppe et al. _____ Oct. 30, 1956

OTHER REFERENCES

Craig: Chem. Reviews, vol. 49, 1951 pages 103–236 (p. 145, 166, 167 particularly).

Jones: Chem. Abstracts, vol. 49, 4546, 7; 4610 (1955).